(12) United States Patent
Dyer et al.

(10) Patent No.: US 9,927,057 B2
(45) Date of Patent: Mar. 27, 2018

(54) BUNDLE TIE WITH HEAD DAMPENER

(71) Applicant: HellermannTyton Corporation, Milwaukee, WI (US)

(72) Inventors: Edward P. Dyer, Germantown, WI (US); Gerard G. Geiger, Jackson, WI (US)

(73) Assignee: HELLERMANNTYTON CORPORATION, Milwaukee, WI (US)

( * ) Notice: Subject to any disclaimer, the term of this patent is extended or adjusted under 35 U.S.C. 154(b) by 0 days.

(21) Appl. No.: 15/175,468

(22) Filed: Jun. 7, 2016

(65) Prior Publication Data

US 2016/0290547 A1    Oct. 6, 2016

Related U.S. Application Data

(62) Division of application No. 14/254,261, filed on Apr. 16, 2014, now Pat. No. 9,387,611, which is a division of application No. 12/381,971, filed on Mar. 18, 2009, now Pat. No. 8,726,468.

(51) Int. Cl.
| | |
|---|---|
| *B65D 63/10* | (2006.01) |
| *F16L 55/02* | (2006.01) |
| *F16L 3/233* | (2006.01) |
| *F16L 55/035* | (2006.01) |
| *B29C 45/16* | (2006.01) |
| *F16L 57/00* | (2006.01) |

(52) U.S. Cl.
CPC .......... *F16L 55/02* (2013.01); *B29C 45/1615* (2013.01); *B29C 45/1635* (2013.01); *B65D 63/10* (2013.01); *B65D 63/1027* (2013.01); *B65D 63/1063* (2013.01); *F16L 3/233* (2013.01); *F16L 55/035* (2013.01); *F16L 57/00* (2013.01); *B65D 2563/108* (2013.01); *Y10T 24/14* (2015.01); *Y10T 24/141* (2015.01); *Y10T 24/1498* (2015.01)

(58) Field of Classification Search
None
See application file for complete search history.

(56) References Cited

U.S. PATENT DOCUMENTS

| | | | | |
|---|---|---|---|---|
| 2,331,098 | A | * 10/1943 | White | F16L 3/1233 |
| | | | | 174/40 CC |
| 2,338,659 | A | 1/1944 | Morehouse | |
| 2,399,899 | A | * 5/1946 | Tinnerman | F16L 3/08 |
| | | | | 174/40 CC |
| 2,416,063 | A | 2/1947 | Nicholls | |

(Continued)

*Primary Examiner* — Edmund Lee
(74) *Attorney, Agent, or Firm* — Robert J. Myers

(57) ABSTRACT

An apparatus according to the present invention provides a bundle tie including a head dampener. The tie generally comprises a strap and a tie head coupled to the strap. The tie head is adapted to engage a free end of the strap, thereby forming a loop, which may be formed or placed about one or a bundle of elongate articles such as conduit, wires, cables, ropes, and pipes, for example. The tie head is provided with a head dampener which serves to cushion what otherwise may be damaging force placed upon the one or more elongate articles by the tie head. The dampener may also serve to limit movement of the one or more elongate articles through the loop formed by the tie.

7 Claims, 8 Drawing Sheets

(56) References Cited

U.S. PATENT DOCUMENTS

| | | | |
|---|---|---|---|
| 2,421,443 A * | 6/1947 | Torresen | F16L 3/1233 174/40 CC |
| 2,455,598 A | 12/1948 | Michalenko | |
| 2,655,703 A | 10/1953 | Flora | |
| 2,923,760 A * | 2/1960 | Famely | F16L 3/1233 174/40 CC |
| 3,041,025 A | 6/1962 | Daly | |
| 3,139,253 A | 6/1964 | Crawford, Jr. et al. | |
| 3,621,107 A * | 11/1971 | Duvendack | H02G 7/00 174/40 CC |
| 3,913,187 A | 10/1975 | Okuda | |
| 3,916,488 A | 11/1975 | Gazda et al. | |
| 3,955,795 A | 12/1976 | Hogan | |
| 4,009,509 A * | 3/1977 | McCormick | F16L 3/2334 24/16 PB |
| 4,222,539 A | 9/1980 | Kramer | |
| 4,441,677 A | 4/1984 | Byerly | |
| 5,083,346 A | 1/1992 | Orton | |
| 5,103,534 A | 4/1992 | Caveney | |
| 5,173,026 A | 12/1992 | Cordola et al. | |
| 5,193,254 A * | 3/1993 | Geisinger | E05B 75/00 24/16 PB |
| 5,257,768 A | 11/1993 | Juenemann et al. | |
| 5,305,978 A | 4/1994 | Current | |
| 5,337,983 A | 8/1994 | Mailey | |
| 5,411,228 A | 5/1995 | Morawa et al. | |
| 5,479,361 A * | 12/1995 | Kurtzberg | G05B 19/41875 700/111 |
| 5,857,244 A | 1/1999 | Edwards et al. | |
| 5,890,265 A * | 4/1999 | Christian | B65D 63/1072 24/16 PB |
| 6,138,327 A | 10/2000 | Powell et al. | |
| 6,168,337 B1 | 1/2001 | Adams | |
| 6,253,421 B1 | 7/2001 | Kraus | |
| 6,481,070 B2 | 11/2002 | Caeran et al. | |
| 6,519,814 B1 | 2/2003 | Mereness | |
| 6,560,822 B2 * | 5/2003 | Caveney | B65D 63/1036 24/16 PB |
| 6,588,074 B2 | 7/2003 | Galkiewicz et al. | |
| 6,676,091 B2 | 1/2004 | Hauer | |
| 6,683,258 B1 | 1/2004 | Tracy et al. | |
| 6,698,069 B2 * | 3/2004 | Caveney | B65D 63/1036 164/303 |
| 6,732,982 B1 | 5/2004 | Messinger | |
| 6,745,439 B2 * | 6/2004 | Brownlee | B65D 63/1036 24/16 PB |
| 7,055,783 B2 | 6/2006 | Rosemann et al. | |
| 7,198,315 B2 | 4/2007 | Cass et al. | |
| 7,201,352 B2 | 4/2007 | Kawai | |
| 7,267,307 B2 | 9/2007 | Bauer | |
| 7,316,375 B2 | 1/2008 | Wakabayashi et al. | |
| 7,866,005 B2 * | 1/2011 | Vermeer | B65D 63/1072 24/16 PB |
| 7,984,572 B2 | 7/2011 | Gallay | |
| 8,020,814 B2 | 9/2011 | Geppert et al. | |
| 8,479,361 B2 * | 7/2013 | Every | B65D 63/1063 24/16 PB |
| 2003/0159256 A1 | 8/2003 | Clarke | |
| 2004/0217236 A1 | 11/2004 | Shibuya | |
| 2005/0241116 A1 | 11/2005 | Stewart et al. | |
| 2006/0099051 A1 | 5/2006 | Moerke | |
| 2006/0162130 A1 * | 7/2006 | Cook | B65D 63/1072 24/16 PB |
| 2010/0102175 A1 | 4/2010 | Dockery et al. | |
| 2010/0146742 A1 * | 6/2010 | Every | B65D 63/1063 24/16 PB |
| 2013/0067698 A1 * | 3/2013 | Kahn | A46B 17/02 24/303 |

\* cited by examiner

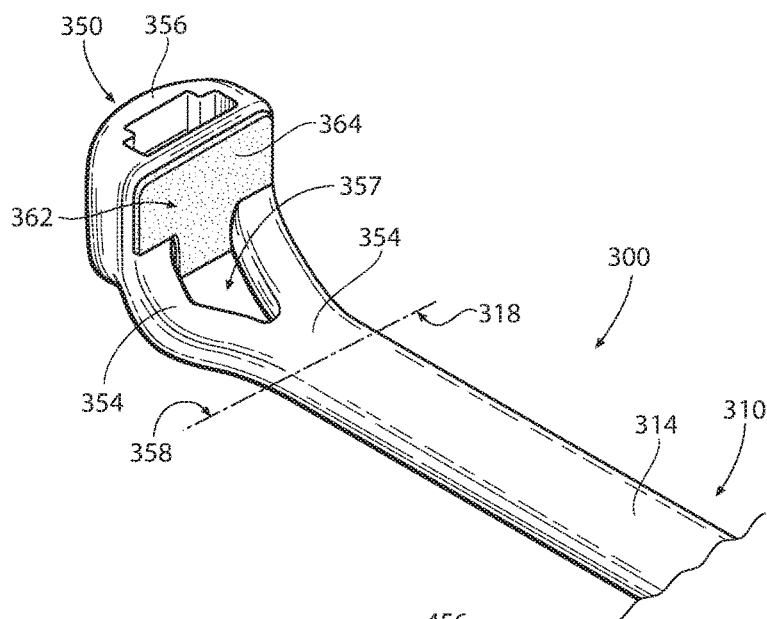
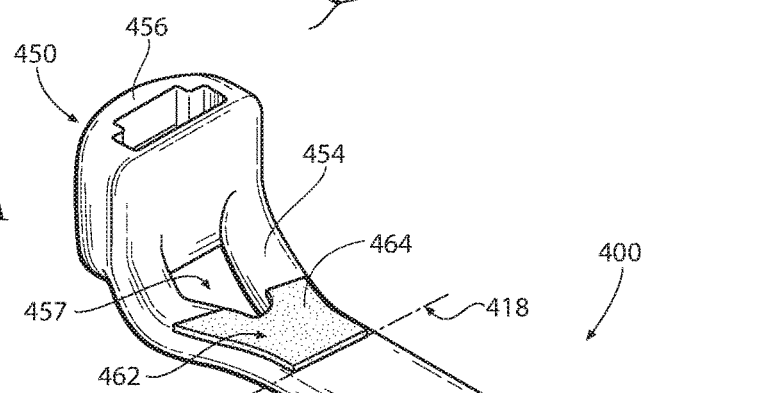
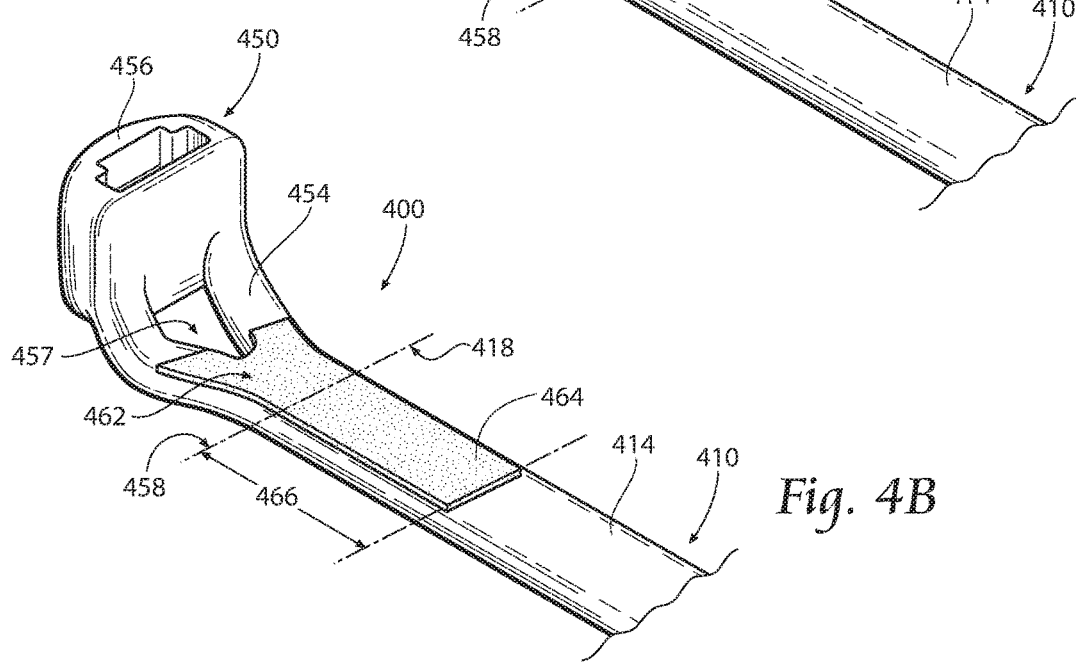

BUNDLE TIE WITH HEAD DAMPENER

RELATED APPLICATIONS

This application is a divisional of U.S. patent application Ser. No. 14/254,261, filed 16 Apr. 2014, which is a divisional of U.S. patent application Ser. No. 12/381,971, filed 18 Mar. 2009, now U.S. Pat. No. 8,726,468, issued 20 May 2014.

BACKGROUND OF THE INVENTION

The present invention is directed generally to bundle ties, and more specifically to a bundle tie having an improved bundle-engaging surface.

Bundle ties, sometimes referred to as cable ties, are generally well known in the art. A typical bundle tie includes a relatively flat strap having a free first end and a tie head coupled to a second end. The tie head generally includes a strap engaging means, which may be provided as an aperture through the tie head and a locking pawl situated on or within the head, the pawl adapted to engage one or more serrations provided on an engaging surface of the strap. When the strap is inserted into the aperture in the tie head and the pawl engages the serrations, the tie generally forms a tie loop.

Prior tie heads have been coupled to a tie strap generally in two orientation: first, normal entry tie heads include an aperture through the tie head that is formed substantially perpendicular to the strap in its formed, at-rest state; and second, parallel entry tie heads include an aperture through the tie head that is formed substantially parallel to the strap in its formed, at-rest state. Further, parallel entry tie heads have been provided at various angles relative to the tie straps. Regardless of the manner in which a tie head is oriented on a tie, it has been observed that certain forces imparted by a tie head onto the bundle being secured may be damaging to the bundle.

Additionally, prior ties have generally been formed out of a relatively strong, yet flexible material, such as plastic, nylon, stainless steel, etc. Many elongate articles in conjunction with which bundle ties are used have a smooth, flexible coating. Thus, it has been noticed that a bundle that was secured by prior devices may be inclined to slip through the loop formed by a prior fastened tie.

Therefore, the art of bundle ties would benefit from a bundle tie having a head dampener to assist in preventing damages to a tied bundle and further to assist in preventing an elongate article, or a plurality of elongate articles, from sliding within a bundle tie loop.

SUMMARY OF THE INVENTION

A device according to the present invention provides a bundle tie having a head dampener to assist in preventing damages to a tied bundle and further to assist in preventing an elongate article, or a plurality of elongate articles, from sliding within a bundle tie loop.

A bundle tie having a head dampener according to the present invention includes an elongate strap, a tie head coupled to the elongate strap and a head dampener provided on at least a portion of the tie head. The head dampener is preferably at least partially comprised of a material that is different than at least part of the tie head. The tie head may include a first head end and a second head end coupled to the strap. The head further includes a head outer surface and a head bundle surface, which is generally opposed from the head outer surface. Extending between the head outer surface and the head bundle surface, from the first head end towards the second head end, is at least one lateral head side. The head dampener is provided on at least a portion of the tie head, such as on a portion of the head bundle surface.

According to an aspect of a bundle tie according to the present invention, the elongate strap generally includes a first strap end, a second strap end, a strap outer surface and a strap bundle surface generally opposed from the strap outer surface. Extending between the strap outer surface and the strap bundle surface is at least one lateral strap side. The strap outer surface, bundle surface and lateral strap sides form a substantially flat strap body extending between and including the first strap end and the second strap end.

According to an aspect of a bundle tie according to the present invention, the tie head may be coupled to the strap by being formed integrally therewith.

According to an aspect of a bundle tie according to the present invention, an aperture may extend through the tie head, the aperture being adapted to receive at least a portion of the strap. The aperture may extend through the head outer surface and the head bundle surface, or the aperture may extend between the head outer surface and the head bundle surface.

According to an aspect of a bundle tie according to the present invention, a head dampener comprising first and second intersecting or nonintersecting dampening rails may be disposed on the head bundle surface. Each of the dampening rails may be positioned closer to one or the other of the lateral head sides.

According to an aspect of a bundle tie according to the present invention, a head dampener may extend onto a portion of the strap, such as the strap bundle surface. The head dampener may extend onto the strap for a desired length, which may include at least a majority of the length of the strap. Where dampening rails are provided as a head dampener, each rail may extend onto the strap along at least substantially similar lengths.

According to an aspect of a bundle tie according to the present invention, the aperture formed through the tie head may extend between the head outer surface and the head bundle surface, through the first head end, at least substantially parallel to a portion of the head bundle surface. The aperture may further include two spaced longitudinal, at least substantially parallel rail channels, each rail channel being in fluid communication with the first head end. Each rail channel may be positioned closer to the head bundle surface than to the head outer surface.

According to an aspect of a bundle tie according to the present invention, a head dampener comprising a dampening film may be disposed on at least a portion of the head bundle surface, or even a majority of the head bundle surface.

According to an aspect of a bundle tie according to the present invention, a dampening film that is disposed on the head bundle surface may extend onto the strap, such as the strap bundle surface, along a predetermined strap film length.

A method according to the present invention of forming a bundle tie having a head dampener includes the steps of providing a tie mold having a bundle tie head cavity and a bundle tie strap cavity, and injecting a first material into the tie mold. The first material is held in the tie mold for a first curing time, thereby creating a bundle tie. The tie head cavity may be modified to create a modified bundle tie head cavity, thereby providing a cavity for forming a head dampener. A second material is injected into the modified bundle tie head cavity. The first and second materials are then held for a second curing time, thereby creating a bundle tie having a head dampener. The bundle tie having a head dampener is then removed from the tie mold.

According to an aspect of a method according to the present invention of forming a bundle tie having a head dampener, such method may include the step of maintaining the bundle tie within the tie mold during the modification of the tie head cavity.

According to an aspect of a method according to the present invention of forming a bundle tie having a head dampener, such method may include removing the bundle tie from the tie mold prior to modifying the tie head cavity, and placing at least a portion of the bundle tie in the modified tie mold prior to injecting the second material into the modified tie mold.

According to an aspect of a method according to the present invention of forming a bundle tie having a head dampener, such method may include a step of modifying the tie strap cavity.

Another method according to the present invention of forming a bundle tie having a head dampener includes the steps of providing a first tie mold having a bundle tie head cavity and a bundle tie strap cavity, and injecting a first material into the first tie mold. The first material is held in the tie mold for a first curing time, thereby creating a bundle tie. The bundle tie is then removed from the first tie mold and placed in a second tie mold having a bundle tie cavity and a head dampener cavity. A second material is injected into the second tie mold to at least substantially fill the head dampener cavity. The first material and the second material are held in the second tie mold for a second curing time, thereby creating a bundle tie having a head dampener. The bundle tie having a head dampener is then removed from the tie mold. Rather than injecting a second material into a modified tie mold, the second material could simply be applied directly to the bundle tie. For example, a pattern of a second material may be disposed on the cured first material. Such pattern may be, for example, a pair of intersecting or nonintersecting beads or rails, or a dampening film.

BRIEF DESCRIPTION OF THE DRAWINGS

FIG. 3 is a perspective view of a third embodiment of a bundle tie according to the present invention.

FIG. 4A is a perspective view of a fourth embodiment of a bundle tie according to the present invention.

FIG. 4B is a perspective view of the embodiment of FIG. 4A, having an extended head dampener.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1A:
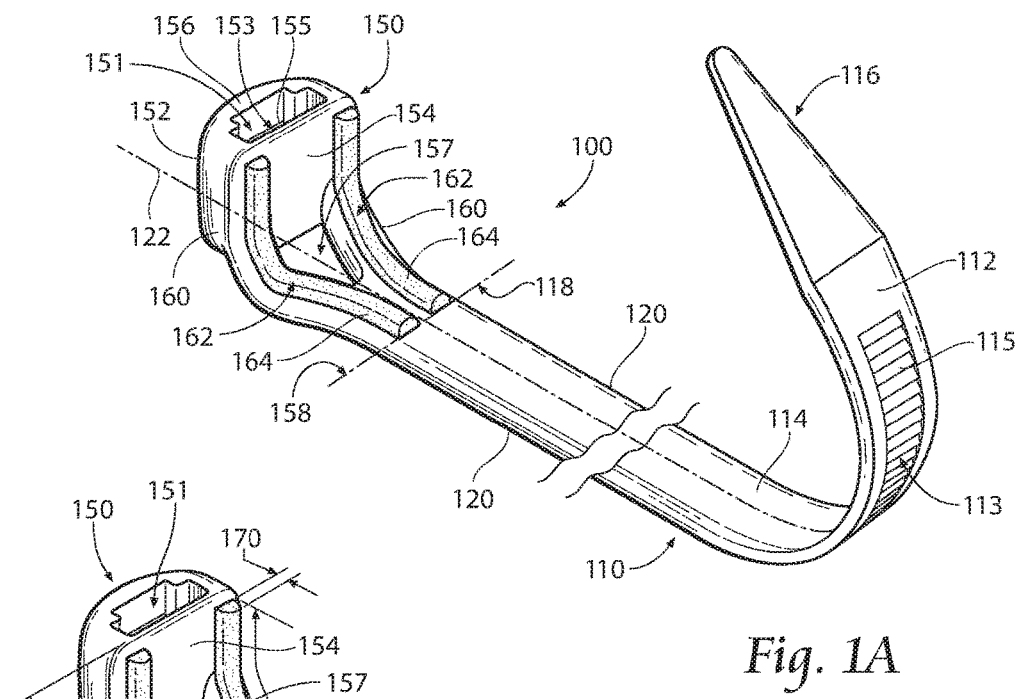
FIG. 1A is a perspective view of a first embodiment of a bundle tie according to the present invention, in a flexed position to show detail.

Turning now to the Figures, FIG. 1A provides a first embodiment 100 of a bundle tie according to the present invention. The tie 100 generally comprises a substantially flat tie strap 110 having a strap outer surface 112 and a strap bundle surface 114 generally opposed from the strap outer surface 112, extending between a first strap end 116 and a second strap end 118. The tie strap 110 includes two lateral strap edges 120, each edge being situated preferably substantially parallel to and equidistant from a central longitudinal axis 122, preferably along at least a majority of the length 111 of the strap 110. At least a portion of the strap 110 is provided with an engagement means 113, such as a plurality of serrations 115 provided on or formed into the strap outer surface 112 or the strap bundle surface 114.

The tie 100 further comprises a tie head 150 coupled to the second strap end 118. The tie head 150 is preferably coupled to the second strap end 118 by being integrally formed therewith. The tie head 150 includes a head outer surface 152 and a head bundle surface 154 generally opposed from the head outer surface 152, extending between a first head end 156 and a second head end 158. The tie head 150 includes two lateral head sides 160, each side being preferably situated substantially equidistant from the central longitudinal axis 122. Formed between the lateral head sides 160 is a throughbore 151 adapted to receive the first strap end 116. As shown, the throughbore 151 may also be formed between the outer surface 152 and the bundle surface 154. Alternatively, the throughbore 151 may be formed through the outer surface 152 and the bundle surface 154, between the lateral head sides 160. The tie head 150 also includes a second engagement means 153, such as a pawl 155, for cooperating with the first engagement means 113 provided on the strap 110. The second engagement means 153 is preferably at least partially situated within the throughbore 151. The head bundle surface 154 extends preferably at least substantially between the two lateral head sides 160, which may be extensions of the lateral strap edges 120, and preferably at least substantially between the first head end 156 and the second head end 158. The head 150 may include a perforate transition section 157, including a non-strap-engaging aperture formed through the head 150, perpendicular to the head bundle surface 154. The head bundle surface 154 is provided with a head dampener 162.

Figure 1B:
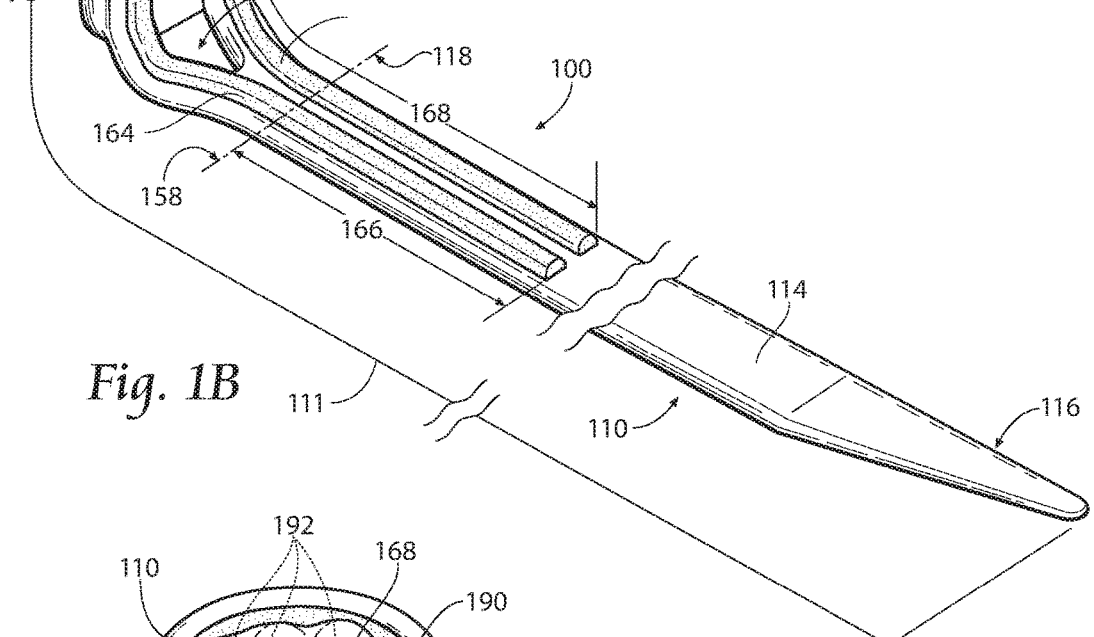
FIG. 1B is a perspective view of a portion of the embodiment of FIG. 1A, having a head dampener extending onto a portion of the tie strap.
Figure 1C:
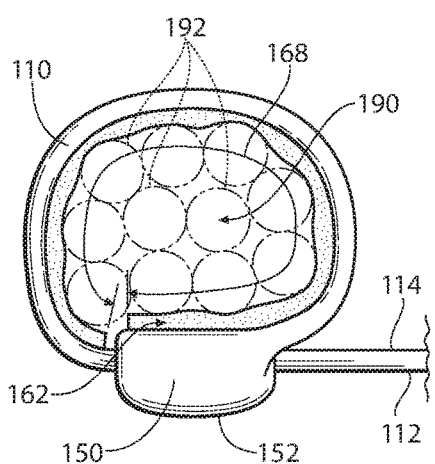
FIG. 1C is an elevation view of the bundle tie of FIG. 1B installed around a bundle.

The head dampener 162 may be formed in a variety of fashions. In this first embodiment 100, the head dampener 162 is a pair of non-intersecting dampening rails 164. While provided as preferably non-intersecting rails 164, it will occur to those in the art that the rails 164 may also be provided as intersecting, as exemplarily discussed below in connection with FIGS. 5B and 5D. While provided at least on the head bundle surface 154, the rails 164 may extend onto the strap bundle surface 114 for a desired rail length 166, as seen in FIG. 1B, the length of which may be a correlated to the planned use for the tie 100. In other words, the length 166 of the dampening rails 164 that extends onto the strap bundle surface 114 may be tailored to result in an overall head dampener length 168 substantially similar to the expected resulting circumference of the tie 100 when it is placed around a predetermined bundle 190 of elongate articles 192, as shown in FIG. 1C. For instance, the dampening rail length 166 may be provided in lengths ranging from about 0.25 inches to about two inches, more preferably ranging from about 0.50 inches to about 1.50 inches. Additionally, a predetermined selection of bundle ties 100 having different dampening rail lengths 166 may be provided in a kit form, thereby providing a user selection. The dampening rails 164 may be provided in any functional thickness 170, disposed on the head bundle surface 154. The dampening rail thickness 170 is preferably in the range of about 0.020 inches to about 0.100 inches, and more preferably the thickness 170 is about 0.039 inches.

While the preferred tie head 150 is shown as a parallel entry tie head that may be formed generally perpendicular to the strap 110, in its at-rest state, any preferred tie head 150 may be used. The at-rest state of the tie 100 is to be understood to mean any resting position adopted by the tie 100 from completion of manufacturing until the final installation of the tie 100 about a bundle. For example, a tie 100 placed upon a level table and being exposed only to the force upon the tie 100 by the table and other ambient environmental forces is a tie 100 in an at-rest state.

Figure 1D:
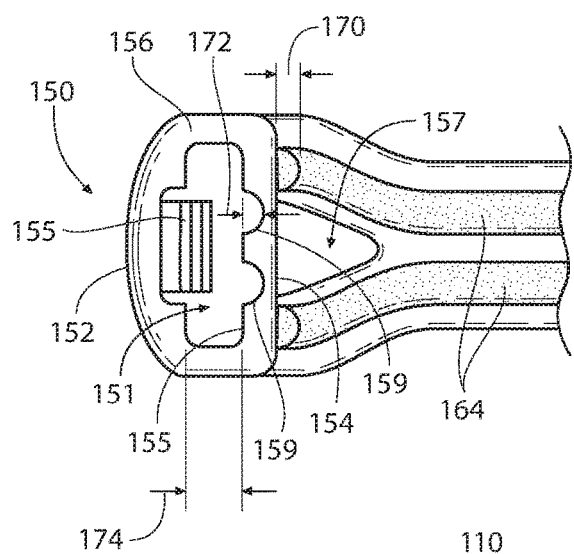
FIG. 1D is a top plan partial cut away view of the embodiment of FIG. 1B further comprising rail clearance channels.
Figure 1E:
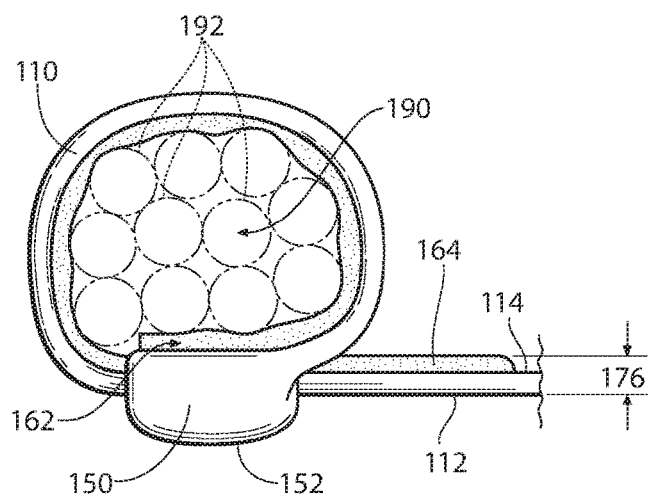
FIG. 1E is an elevation view of the bundle tie of FIG. 1D installed around a bundle.

As shown in FIG. 1D and FIG. 1E, if the head dampener 162 is provided along a length 166 on the tie strap 112, and the strap 112 is to be fastened around a bundle 190 that has a general annular circumference that is less than the overall head dampener length 168, or if the dampener 162 is provided along the entire length of the lateral strap edges 120, then it is preferable to provide clearance for the dampener 162 while maintaining adequate engagement means support to oppose any lateral force exerted by the pawl 155. Dampener clearance may be provided by rail clearance channels 159 formed as radial extensions of the head throughbore 151. The clearance channels 159, of which there are preferably the same number as there are rails 164, are formed at a depth 172 that is preferably at least as great as the rail thickness 170. Alternatively, the rail channel depth 172 may be less than the rail thickness 170, preferably so long as an operative throughbore depth 174 is at least as great as an operative strap depth 176. Alternatively, the operative throughbore depth 174 may be slightly less than the operative stray thickness 176, which may cause a frictional engagement of the clearance channels 159 with the rails 164.

Figure 1F:
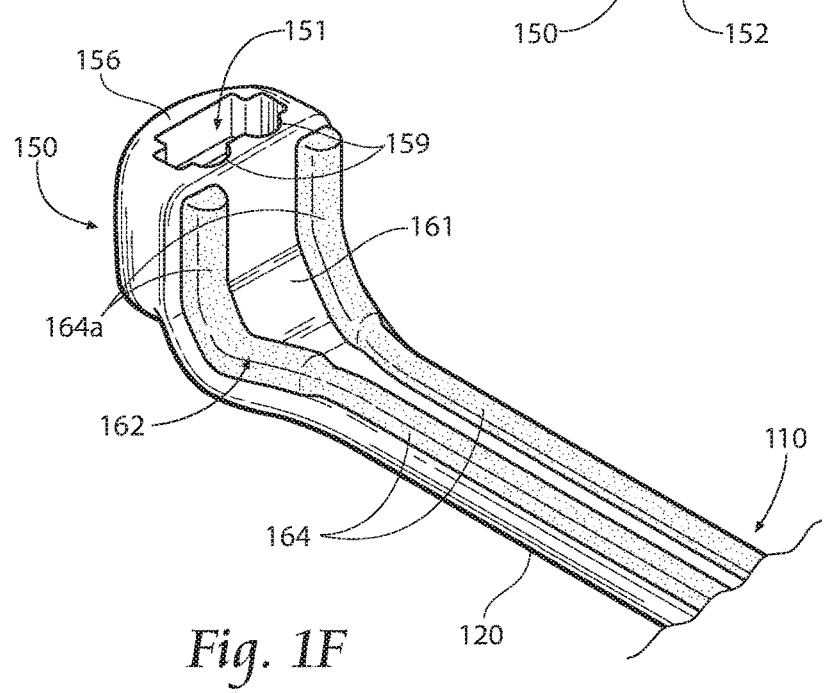
FIG. 1F is a perspective partial cut away view of the embodiment of FIG. 1B, further comprising enhanced head dampening rails.

FIG. 1F depicts the embodiment of FIG. 1D, further comprising expanded head rail portions 164a. The expanded head rail portions 164a provide a greater rail thickness 170, and preferably width, also. Such expanded rail volume may provide altered rail resiliency characteristics, as well as a greater rail surface area, which may be desirable for some applications. Additionally, the perforate transition section 157 of FIG. 1D has been substituted by an imperforate transition section 161.

Figure 1G:
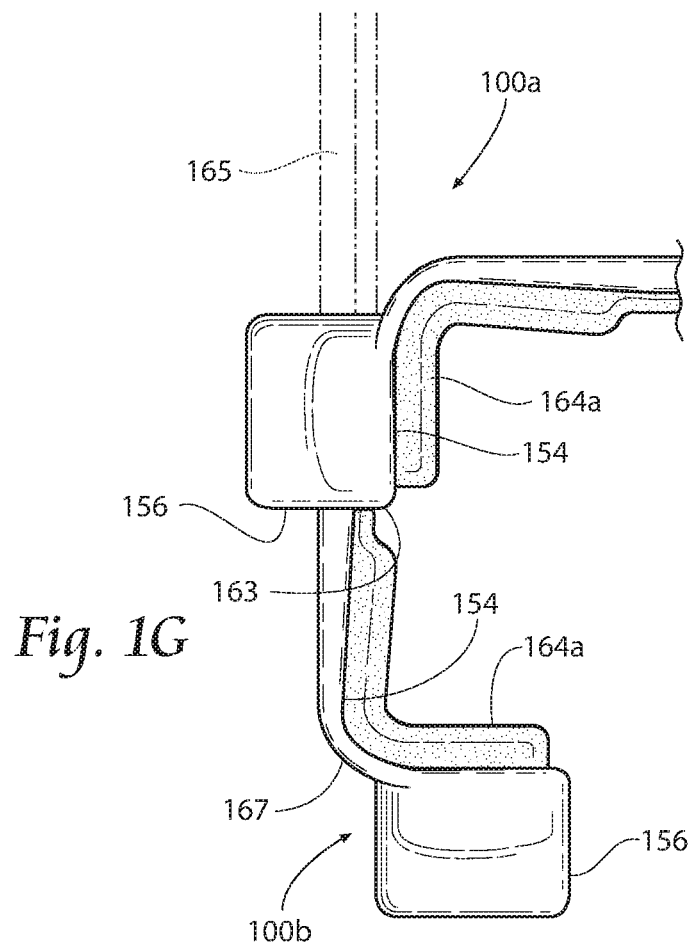
FIG. 1G is a perspective partial cut away view of a plurality of ties according to the embodiment of FIG. 1F in an open loop configuration.

FIG. 1G depicts two bundle ties according to the embodiment of FIG. 1F, joined to form a partially open loop. That is, the strap 110 of a second bundle tie 100b has been inserted through the throughbore 151 of a first bundle tie 100a, and excess strap length 165 has been trimmed off. The first engagement means 113 of the second tie 100b has been engaged by the second engagement means 153 of the first tie 100a, to resist withdrawal from the throughbore 151. Such a looping arrangement may be desirable if the overall head dampener length 168 of one tie 100, such as the first tie 100a, is less than the general annular circumference of the bundle 190 to be secured. Therefore, the addition of the second tie 100b serves to increase, effectively, the overall head dampener length 168 of a single tie 100. While the arrangement may be achieved generally with any embodiment of the present invention, it may be preferable to utilize two ties 100 having the expanded head rail portions 164a so as to minimize pressure of the leading bundle surface edge 163 of at least one of the ties, in the pictured case, the first tie 100a. As can also be seen in FIG. 1G, a transition portion 167 of the tie head 150 may be thinner than the rest of the strap 110, as measured perpendicular to trio bundle surface 154.

Figure 1H:
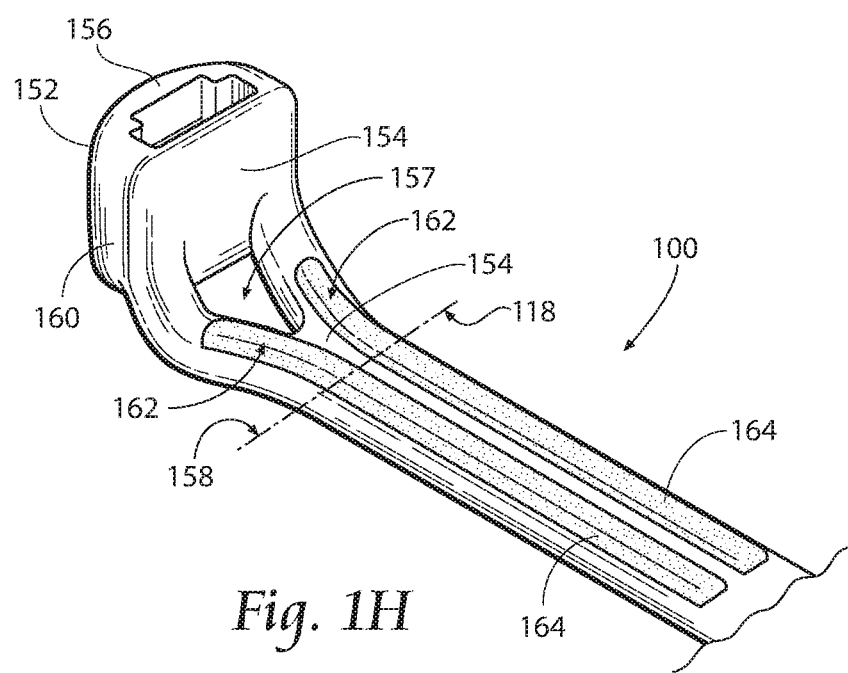
FIG. 1H is a perspective view of a portion of the embodiment of FIG. 1B, having a shortened head dampener.

FIG. 1H displays an alternate first embodiment 100, having the head dampener 162 extending from the head second end 158 towards toe head first end 156, along less than a majority of the head bundle surface 154. Optionally, the dampener 162, provided in this embodiment as a pair of dampening rails 164, may onto the strap bundle surface 114 for a desired rail length 166.

Figure 2A:
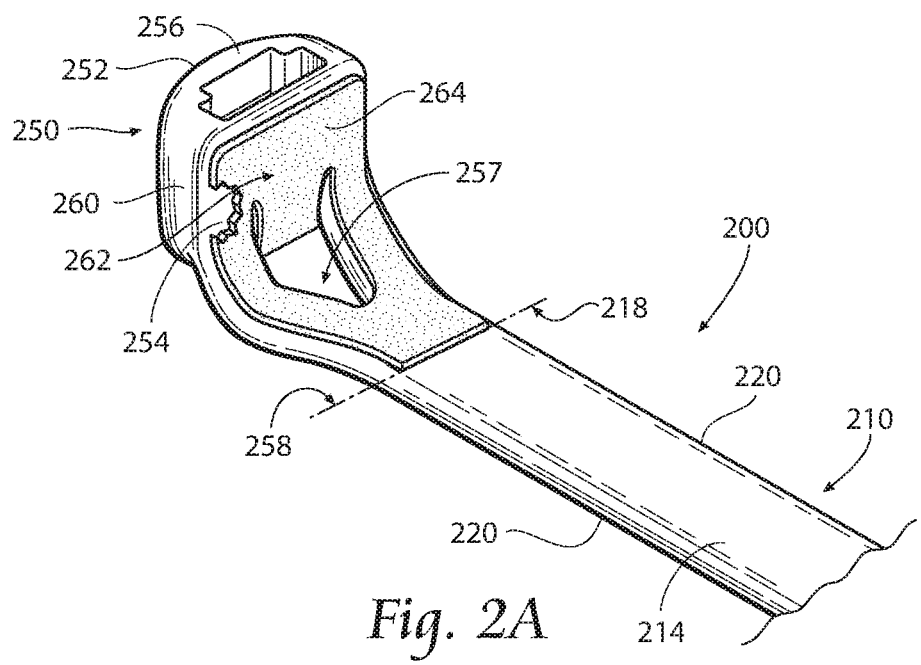
FIG. 2A is a perspective view of a second embodiment of a bundle tie according to the present invention.
Figure 2B:
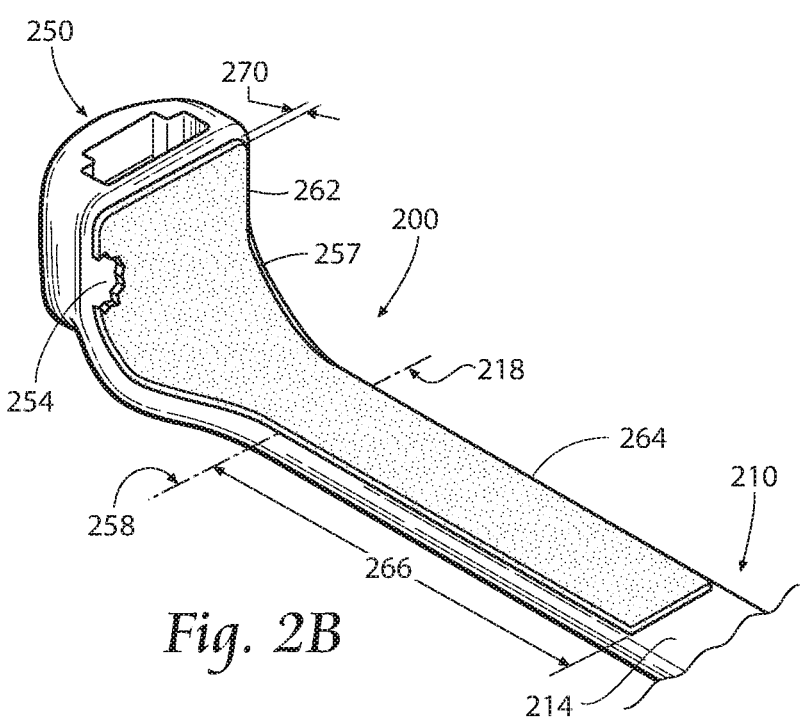
FIG. 2B is a perspective view of the embodiment of FIG. 2A, having an extended head dampener.

FIG. 2A displays a second embodiment 200 of a bundle tie according to the present invention, where like reference numbers refer to similar structure to that of the first embodiment. Like the first embodiment 100, this embodiment 200 is provided with a head dampener 262. Rather than providing the dampening rails 164, as in the first embodiment 100, this embodiment 200 utilizes a dampening film 264. The dampening film 264 is preferably provided in a substantially uniform thickness across at least substantially the entire head bundle surface 254. While provided at least on a portion of the head bundle surface 254, the film 264 may extend onto the strap bundle surface 214 for a desired film length 266, as seen in FIG. 2B, the length of which may be a related to the planned use for the tie 200. For instance, the dampening film length 266 may be provided in lengths ranging from about 0.25 inches to about two inches, more preferably ranging from about 0.50 inches to about 1.50 inches. Additionally, a predetermined selection of bundle ties 200 having different dampening film lengths 266 may be provided in a kit form, thereby providing a user selection. The dampening film 264 may be provided in any functional thickness 270, disposed on the head bundle surface 254.

FIG. 3 displays a third embodiment 300 of a bundle tie according to the present invention, where like reference numbers refer to similar structure to that of the second embodiment 200. Like the second embodiment 200, this embodiment 300 includes a head dampener 362 in the form of a dampening film 364. However, this embodiment 300 includes the film 364 on only a portion of the head bundle surface 354, not substantially the entire head bundle surface 354, like the film 264 of the second embodiment 200.

FIG. 4A displays a fourth embodiment 400 of a bundle tie according to the present invention, where like reference numbers refer to similar structure to that of the third embodiment. This embodiment 400, like the third embodiment 300, includes a dampening film 464 on only a portion of the head bundle surface 454. However, the dampening film 464 extends from the head second end 458, and may extend onto the strap bundle surface 414 for a predetermined length 466, as seen in FIG. 4B.

Figure 5A:
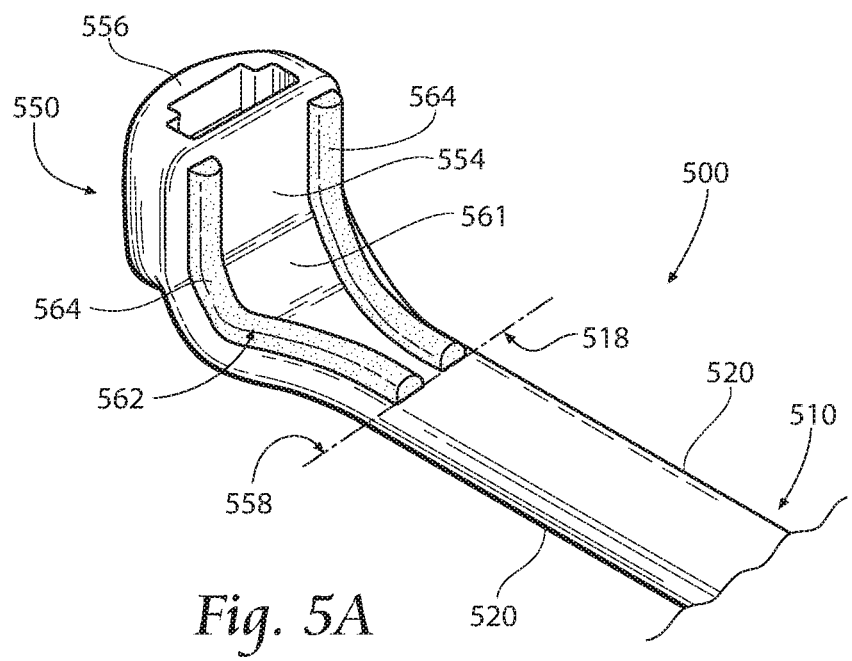
FIG. 5A is a perspective partial cut away view of a fifth embodiment of a bundle tie according to the present invention.

FIG. 5A depicts a fifth embodiment 500 of a bundle tie according to the present invention, where like reference numbers refer to similar structure to that of the first embodiment. Unlike the perforate transition portion 157 of the first embodiment, this embodiment includes an imperforate transition portion 561.

Figure 5B:
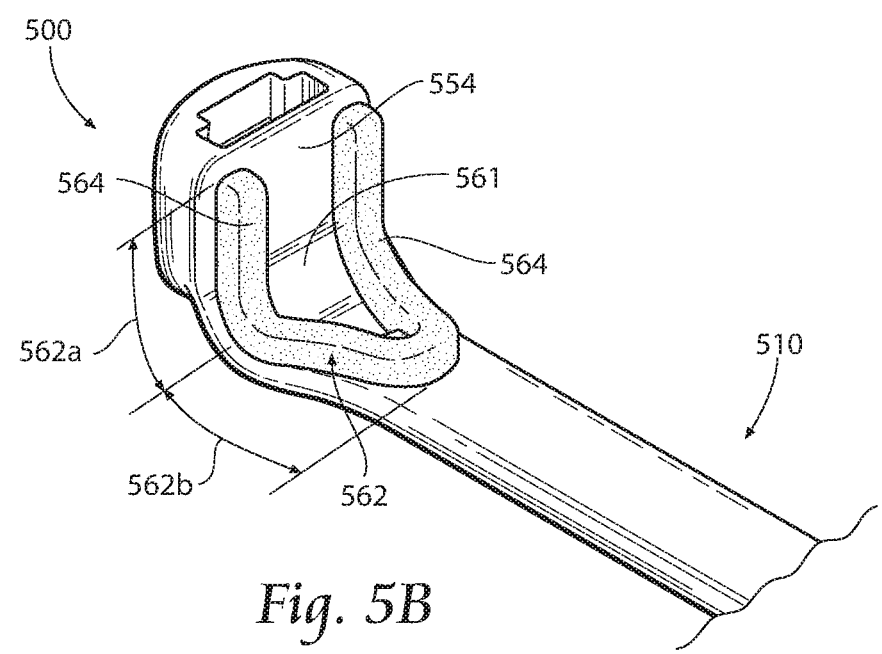
FIG. 5B is a perspective partial cut away view of the embodiment of FIG. 5A, wherein the dampening rails intersect.

FIG. 5B depicts an alternate fifth embodiment 500 of a bundle tie according to the present invention, where like reference numbers refer to similar structure to that of the first embodiment 100. Unlike the separate and distinct rails 564 provided in FIG. 5A, this alternate embodiment provides a pair of intersecting dampening rails 564. The rails 564 generally intersect to form a V-shape head dampener 562, which may include a first length 562*a* along which the dampening rails 564 are at least substantially parallel, and a second length 562*b*, along which the dampening rails 564 converge.

Figure 5C:
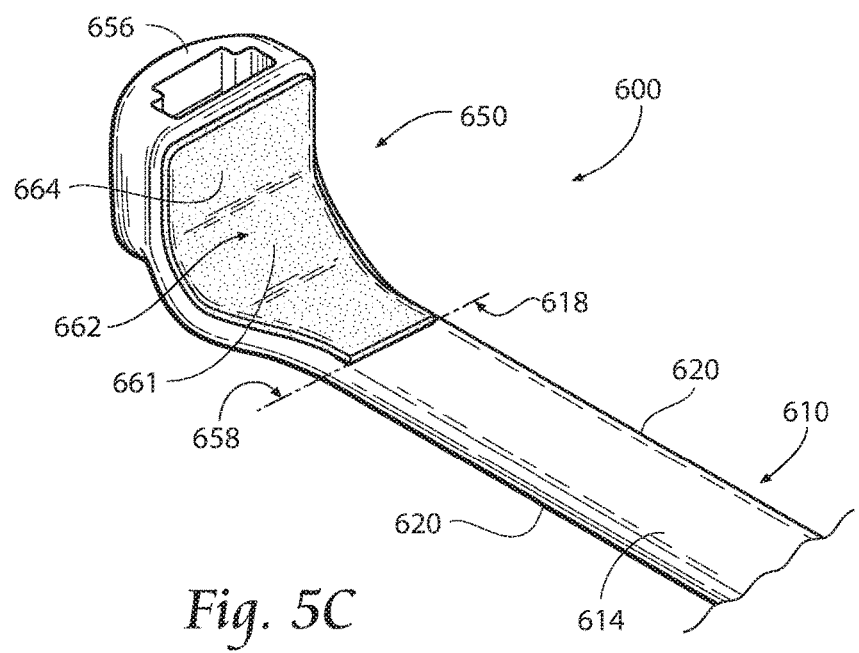
FIG. 5C is a perspective partial cut away view of a sixth embodiment of a bundle tie according to the present invention.

FIG. 5C is a perspective partial cut away view of a sixth embodiment 600 of a bundle tie according to the present invention, where like reference numbers refer to similar structure to that of the embodiment of FIG. 2A. Unlike the perforate transition portion 257 of the first embodiment, this embodiment includes an imperforate transition portion 661.

Figure 5D:
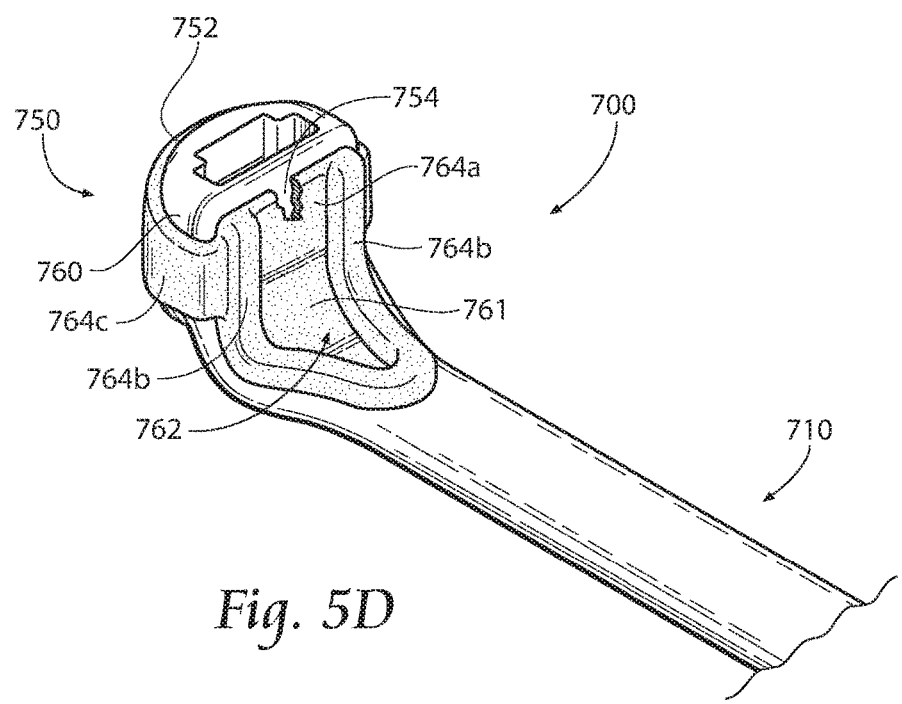
FIG. 5D is a perspective partial cut away view of a seventh embodiment of a bundle tie according to the present invention.

FIG. 5D is a perspective partial cut away view of a seventh embodiment 700 of a bundle tie according to the present invention, where like reference numbers refer to similar structure to that of the sixth embodiment 600. The head dampener 762 of this embodiment 700 includes at least two, and preferably three, components. First, a dampening film 764*a* is provided. Second, dampening rails 764*b* are provided. Additionally, a dampening sleeve 764*c* may also be provided. While these dampener components may be provided as separate and distinct components, it is preferable to provide the components as molded integrally together, and of the same material. The dampening film 764*a* is disposed directly on the head bundle surface 754, covering at least a majority thereof. The dampening rails 764*b* are disposed on top of or adjacent to the dampening film 764*a*. The rails 764*b* are preferably provided as intersecting rails, as shown, similar to the rails of the alternate fifth embodiment 500 of FIG. 5B. Alternatively, the rails 764*b* may be provided as nonintersecting rails, similar to those of the fifth embodiment 500 of FIG. 5A. The dampening sleeve 764*c* is a band of material that encircles the remainder of a circumference of the tie head 750 formed by the head bundle surface 754, the head lateral sides 760 and the head outer surface 752. Rather than being molded onto the tie head 750, a dampener 762 including the dampener sleeve 764*c* may be provided as a separate piece part, to be friction fitted to the head 750. The transition section 761 of the tie head 750 of this embodiment 700 is preferably imperforate.

Bundle ties according to the present invention are preferably injection molded and formed from a strong, yet flexible material such as various plastics, nylon, and the like. The dampening rails and films of the disclosed embodiments may be formed from any desirable material. A preferred elastomeric material may be used, such as a silicone elastomer. Other possible dampener materials include thermoplastic elastomers (TPE), such as thermoplastic vulcanizates (TPV) and thermoplastic styrenics (TPS), thermoplastic olefin (TPO), and thermoplastic urethane (TPU). While the head dampeners of the various embodiments may be adhered to the tie heads and straps after manufacture, the ties are preferably made by using a multi-material molding process, such as a multi-shot injection molding process where the tie is molded first, the injection molding cavity of the tie mold is altered or the tie is moved to a second tie mold, and the elastomeric material is injected to bond to at least a portion of the head and form the desired head dampener.

Figure 6A:
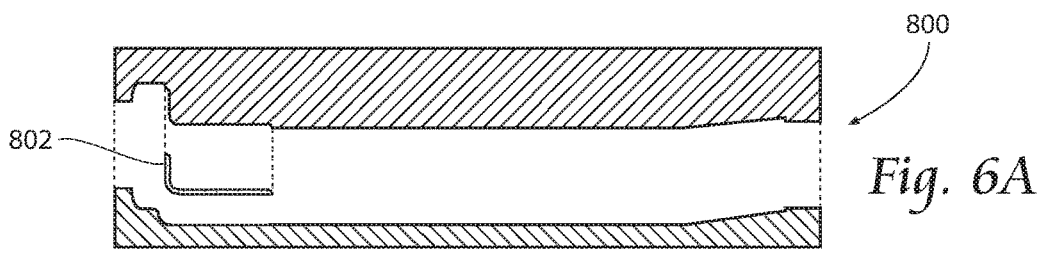
FIG. 6A is a first cross-section view of a first tie mold that may be implemented in a method according to the present invention.
Figure 6B:
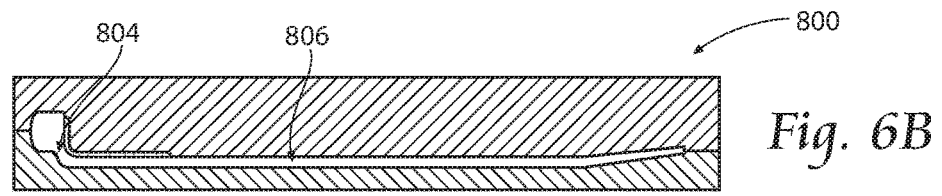
FIG. 6B is a second cross-section view of the first tie mold of FIG. 6A.
Figure 6C:
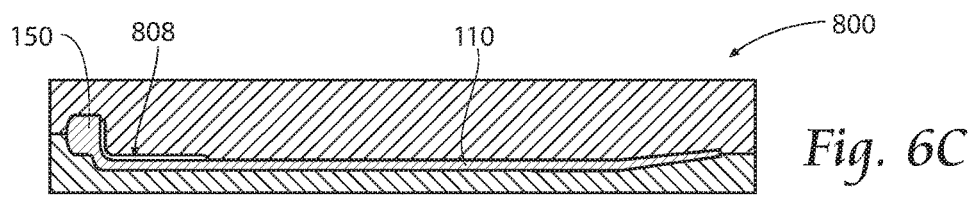
FIG. 6C is a third cross-section view of the first tie mold of FIG. 6A, showing the insert removed.

FIGS. 6A, 6B, and 6C depict steps included in a first process for manufacturing a bundle tie according to the present invention. FIG. 6A shows a two-piece tie mold 800 with a removable insert 802. When first assembled, as shown in FIG. 6B, the mold 800 provides a bundle tie head cavity 804 in fluid communication with a bundle tie strap cavity 806. The insert 802 interfaces at least a portion of the tie head cavity 804. A first material is injected into the tie mold 800. The first material is held for a first curing time, allowing the material to cure to a sufficient or desired hardness, thereby forming a bundle tie head 150 coupled to a bundle tie strap 110. The mold 800 is then modified by removing the mold insert 802, thereby creating a modified bundle tie head cavity 808. If the coupled molded tie head 150 and strap 110 were removed from the mold 800 to remove the insert 802, it is replaced into the mold 800, as shown in FIG. 6C. A second material is injected into the modified bundle tie head cavity 808. To create a bundle tie having a head dampener, the first material and second material are held in the mold 800 for a second curing time, which may be shorter, the same as, or longer than the first curing time, depending on materials used. A completed bundle tie, e.g. the tie 100 in FIG. 1B, is then removed from the mold 800.

Figure 7A:
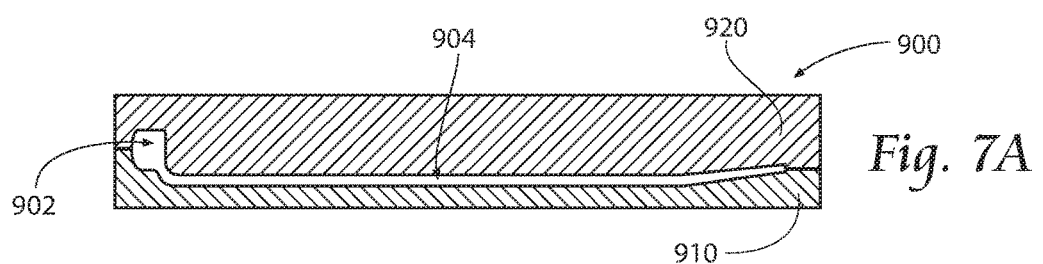
FIG. 7A is a first cross-section view of a second tie mold that may be used in a method according to the present invention.
Figure 7B:
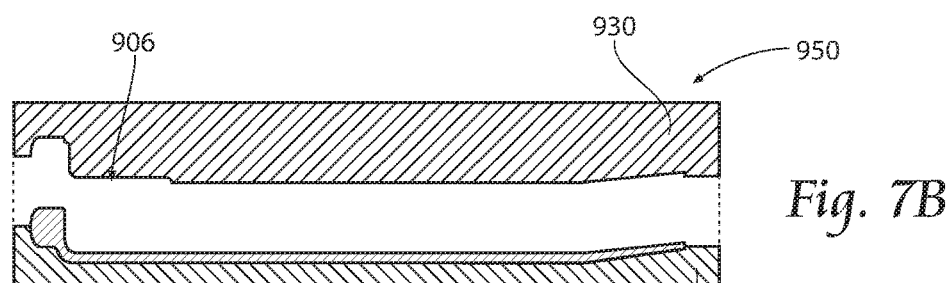
FIG. 7B is a first cross-section view of a third tie mold that may be used in a method according to the present invention.
Figure 7C:
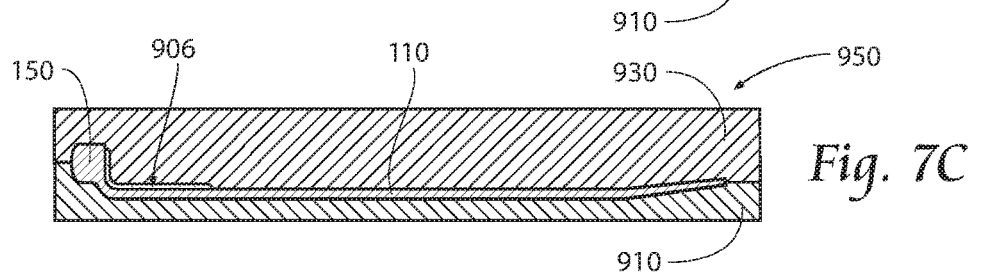
FIG. 7C is a second cross-section view of the third tie mold of FIG. 7B.

FIGS. 7A, 7B, and 7C depict steps included in a second process for manufacturing a bundle tie according to the present invention. In this process, a plurality of micas is used in series to successively mold different portions of a completed bundle tie. FIG. 7A provides a first tie mold 900 having a bundle tie head cavity 902 and a bundle tie strap cavity 904. A first material in injected into the first tie mold 900 and held for a first curing time, thereby creating a bundle tie having a head 150 coupled to a strap 110. The bundle tie is removed from the first tie mold 900 and is placed into a second tie mold 950, as shown in FIG. 7B. The second tie mold 950 has a bundle tie cavity, in which the bundle tie is situated, and a cooperating head dampener cavity 906, which interfaces at least a portion of the bundle tie head 150, when a bundle tie is placed in the second mold 950. A second material is in into the second tie mold 950 to at least substantially fill the head dampener cavity 906. A bundle tie having a head dampener is then formed by holding the bundle tie and second material in the second tie mold 950 for a second curing time, which may be shorter, the same as, or longer than the first curing time. A completed bundle tie, e.g. tie 100 in FIG. 1B, is then removed from the second tie mold 950. One advantage of using a two mold process, as partially illustrated in FIGS. 7A-7C, is that a second bundle tie may be formed contemporaneously with the forming of a head dampener on the first tie. That is, once a first tie is removed from the first tie mold 900 and placed in the second tie mold 950 to form the head dampener on the first tie, the first tie mold 900 may be used to form a second bundle tie.

The method partially depicted in FIGS. 7A-7C may be changed without departing from the invention. For instance, rather than removing the tie from a first mold 900 and placing it in a second mold 950, the tie may remain in a strap mold base 910, and may be associated with a dampening mold 930. Thus, the second mold 950 would be formed by the strap mold base 910 into which the strap material was injected, and by the dampening mold 930, which includes the head dampener cavity 906. Such association of a strap mold base 910 and a dampening mold 930 may be achieved a variety of ways, such as by horizontal or vertical rotation of the mold base 910 after the first curing time, and registration of the mold base 910 with the dampening mold 930. Basically, the molding process may be achieved through any known or later developed molding technologies, including core toggle molding, robotic transfer, rotary platen, indexing plate and horizontal rotary stack.

Alternatively, rather than modifying a tie mold or changing tie molds, a second material may be applied or disposed directly onto the bundle tie in a preferred pattern, or a cured second material may be adhered to the bundle tie. The application of a second material directly onto the bundle tie may be achieved by extruding a bead of the second material substantially contemporaneously with the placement of the second material onto the bundle tie.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. A bundle tie comprising:
an elongate strap;
a tie head coupled to said elongate strap, said tie head comprising:
   a first head end,
   a second head end coupled to a second strap end,
   a head outer surface, and
   a head bundle surface generally opposed from said head outer surface, wherein at least one lateral head side extends between said head outer surface and said head bundle surface from said first head end towards said second head end; and
a head dampener in the form of a pair of intersecting dampening rails provided on at least a portion of said tie head and at least a portion of said head bundle surface, wherein said pair of intersecting dampening rails are formed of a different material than at least a portion of said tie head and wherein a length of said pair of intersecting dampening rails extends from said head bundle surface onto said elongated strap along a predetermined strap length.

2. The bundle tie according to claim 1, wherein said pair of intersecting dampening rails covers a majority of said head bundle surface.

3. The bundle tie according to claim 1, wherein said length of said pair of intersecting dampening rails is less than an annular circumference of a bundle contained by said bundle tie.

4. The bundle tie according to claim 1, wherein a thickness of said pair of intersecting dampening rails is in a range of 0.5 millimeters to 2.5 millimeters.

5. The bundle tie according to claim 1, wherein the different material forming the pair of intersecting dampening rails is selected from the list consisting of thermoplastic elastomers, thermoplastic vulcanizates, thermoplastic styrenics, thermoplastic olefins, and thermoplastic urethanes.

6. The bundle tie according to claim 1, wherein the pair of intersecting dampening rails include a first length along which the dampening rails are substantially parallel and as second length along which the dampening rails converge.

7. The bundle tie according to claim 1, wherein the pair of intersecting dampening rails intersect to form a V shape.

* * * * *